United States Patent
Mihara

(10) Patent No.: US 8,498,004 B2
(45) Date of Patent: Jul. 30, 2013

(54) IMAGE PROCESSING APPARATUS AND METHOD FOR CONTROLLING IMAGE PROCESSING APPARATUS

(75) Inventor: Makoto Mihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1277 days.

(21) Appl. No.: 11/849,186

(22) Filed: Aug. 31, 2007

(65) Prior Publication Data

US 2008/0259382 A1    Oct. 23, 2008

(30) Foreign Application Priority Data

Dec. 12, 2006   (JP) ................................. 2006-334430

(51) Int. Cl.
*G06F 3/12* (2006.01)

(52) U.S. Cl.
USPC ........................................ 358/1.15; 709/223

(58) Field of Classification Search
None
See application file for complete search history.

(56) References Cited

U.S. PATENT DOCUMENTS

| 5,630,062 A * | 5/1997 | Okutsu ......................... 718/100 |
| 2006/0126111 A1* | 6/2006 | Song et al. .................... 358/1.15 |
| 2007/0247661 A1* | 10/2007 | Minami et al. ............... 358/1.15 |
| 2007/0273896 A1* | 11/2007 | Yamamura ..................... 358/1.1 |

FOREIGN PATENT DOCUMENTS

| JP | 11-177755 A | 7/1999 |
| JP | 2000-39975 A | 2/2000 |

* cited by examiner

*Primary Examiner* — Twyler Haskins
*Assistant Examiner* — Lennin Rodriguezgonzalez
(74) *Attorney, Agent, or Firm* — Canon USA, Inc., IP Division

(57) ABSTRACT

An image processing apparatus includes a storage unit configured to store information about an other image processing apparatus different than the image processing apparatus that operates with the image processing apparatus, an acquiring unit configured to acquire function information indicating a function provided by a first image processing apparatus, and a control unit. In the control unit, in a case that a comparison result of the comparing unit indicates that the first image processing apparatus includes at least one function not provided by the image processing apparatus, information about the first image processing apparatus is stored in the storage unit, and in a case that a comparison result of the comparing unit indicates that the first image processing apparatus doesn't include at least one function not provided by the image processing apparatus, information about the first image processing apparatus is not stored in the storage unit.

8 Claims, 12 Drawing Sheets

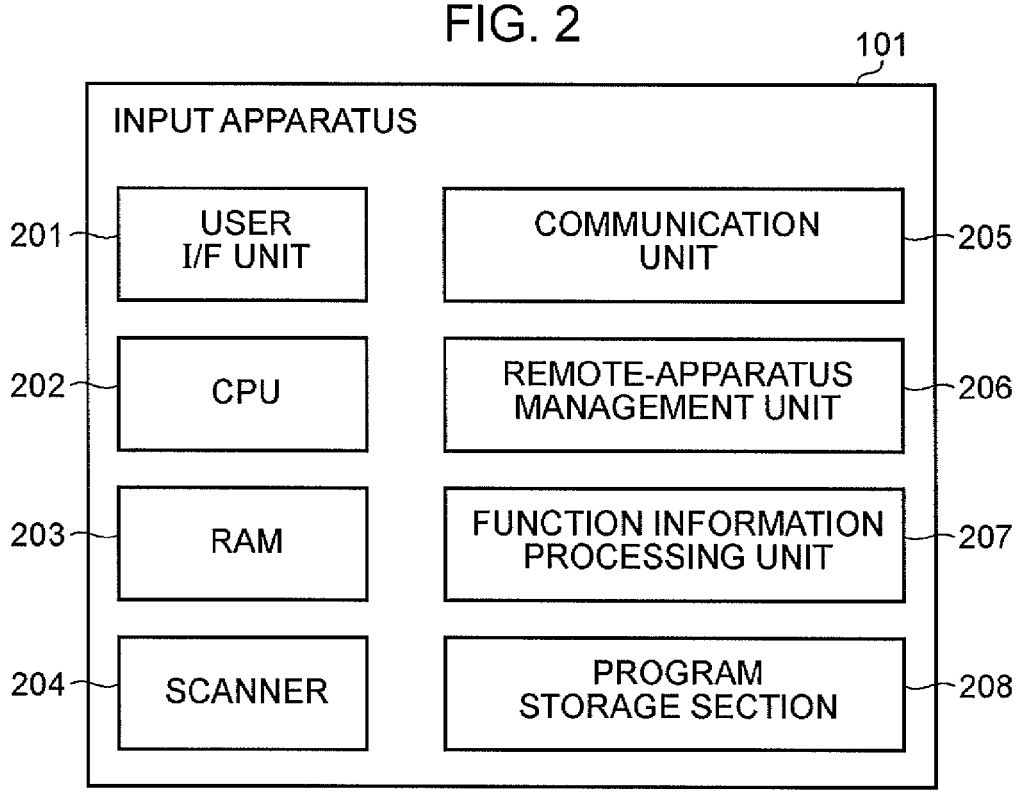
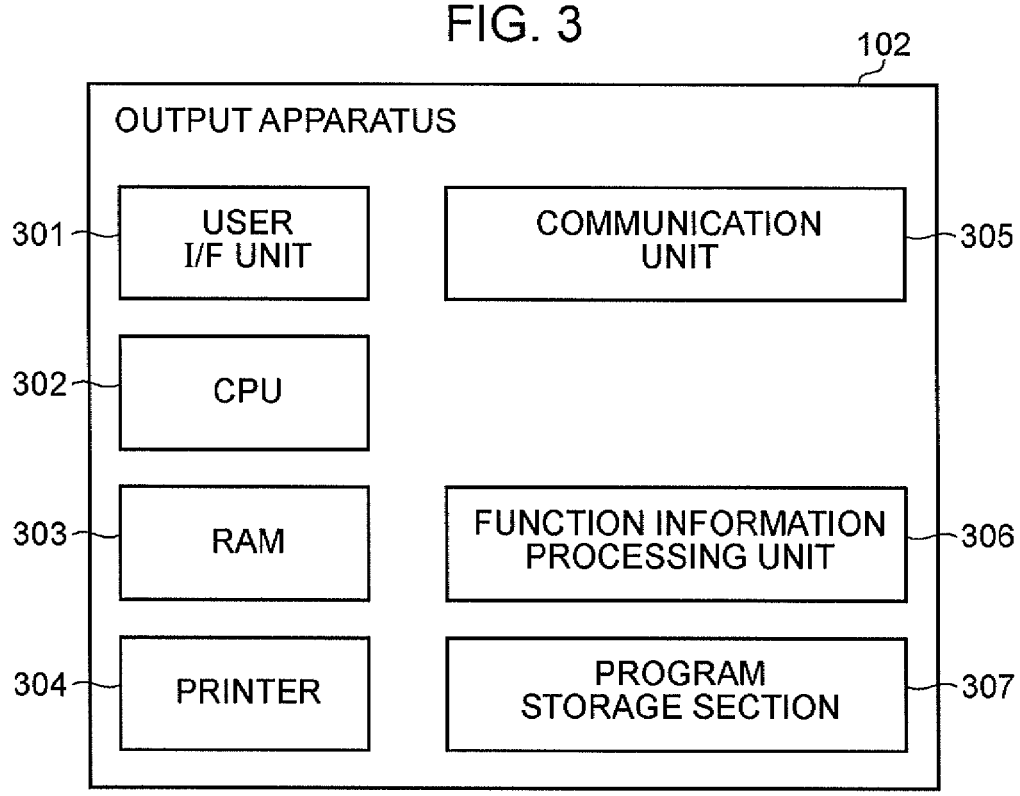

FIG. 5

| IP ADDRESS | NAME OF APPARATUS | SHEET SIZE | COLOR MODE | PRINTING METHOD | PAPER OUTPUT METHOD |
|---|---|---|---|---|---|
| 192.168.0.20 | Printer-0001 | A3/A4 | COLOR/ MONOCHROME | SIMPLEX/ DUPLEX | SORTING/GROUPING /STAPLING |
| 192.168.0.30 | MFP-0001 | A3/A4 B4/B5 | MONOCHROME | SIMPLEX/ DUPLEX | SORTING/GROUPING |

FIG. 6

| IP ADDRESS | SHEET SIZE | COLOR MODE | PRINTING METHOD | PAPER OUTPUT METHOD |
|---|---|---|---|---|
| 192.168.0.20 | A3/A4 | MONOCHROME | SIMPLEX/ DUPLEX | SORTING/GROUPING /STAPLING |
| 192.168.0.30 | A3/A4 B4/B5 | MONOCHROME | SIMPLEX/ DUPLEX | SORTING/GROUPING |

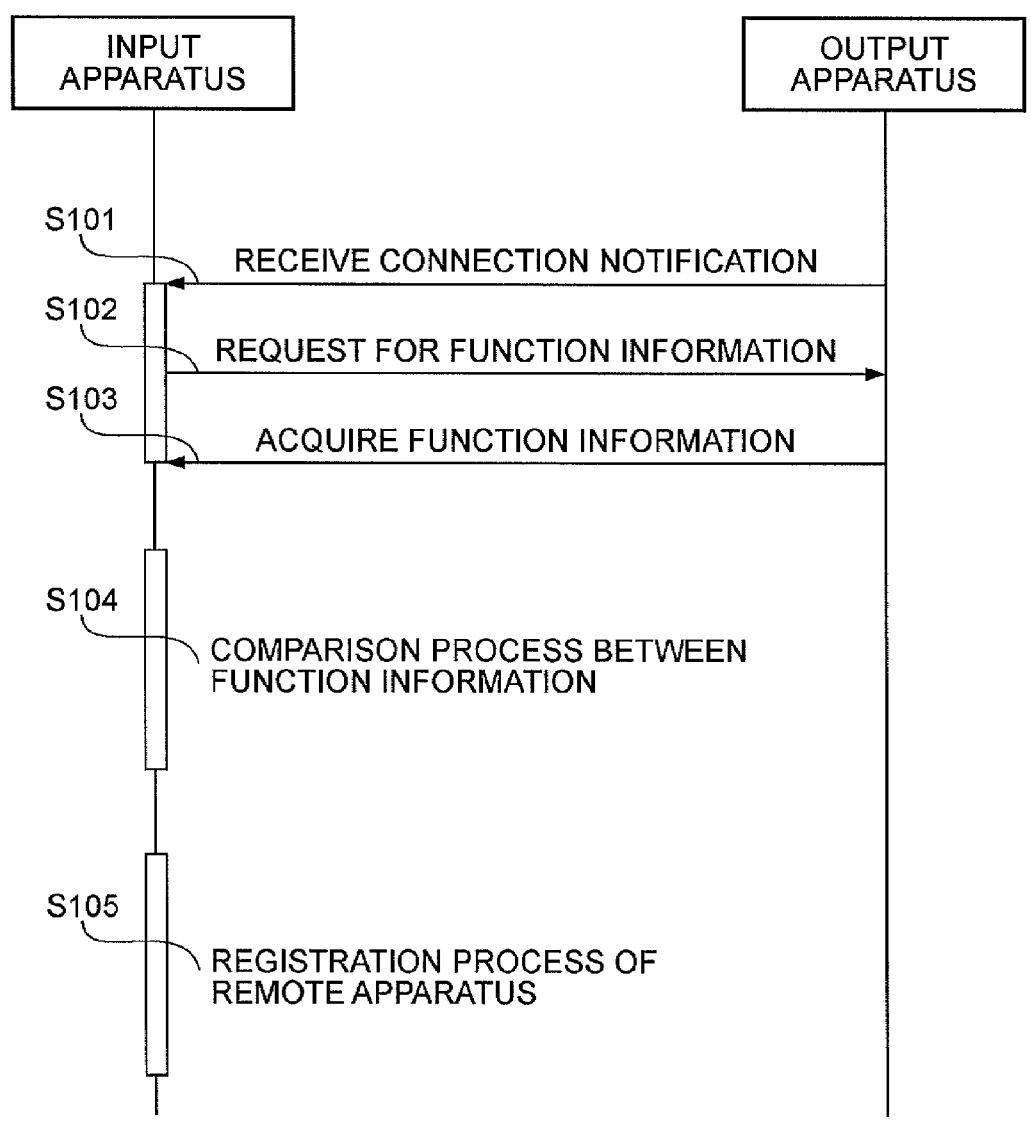

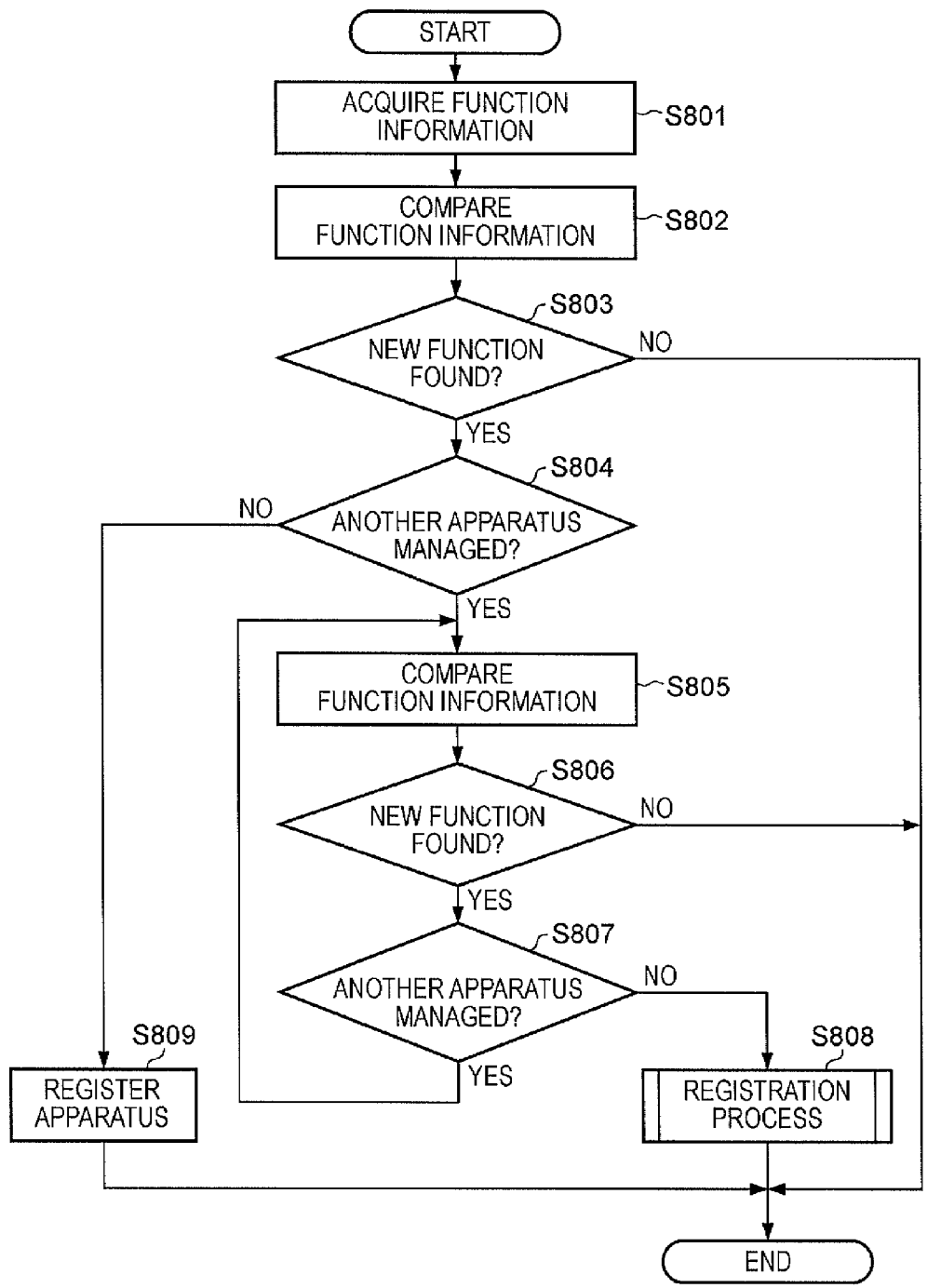

FIG. 9

901
TYPE OF APPARATUS: INPUT/OUTPUT
NAME OF APPARATUS: MFP-0001
IP ADDRESS: 192.168.1.10
SHEET SIZE: A3/A4/B4/B5
COLOR MODE: COLOR/MONOCHROME
PRINTING METHOD: SIMPLEX
PAPER OUTPUT METHOD: SORTING/GROUPING

902
TYPE OF APPARATUS: INPUT/OUTPUT
NAME OF APPARATUS: MFP-0002
IP ADDRESS: 192.168.1.20
SHEET SIZE: A3/A4/B4/B5
COLOR MODE: MONOCHROME
PRINTING METHOD: SIMPLEX/DUPLEX
PAPER OUTPUT METHOD: SORTING/GROUPING

903
TYPE OF APPARATUS: INPUT/OUTPUT
NAME OF APPARATUS: MFP-0003
IP ADDRESS: 192.168.1.30
SHEET SIZE: A3/A4/B4/B5
COLOR MODE: COLOR/MONOCHROME
PRINTING METHOD: SIMPLEX
PAPER OUTPUT METHOD: SORTING/GROUPING/STAPLING

904
TYPE OF APPARATUS: INPUT/OUTPUT
NAME OF APPARATUS: MFP-0004
IP ADDRESS: 192.168.1.40
SHEET SIZE: A3/A4/B4/B5
COLOR MODE: COLOR/MONOCHROME
PRINTING METHOD: SIMPLEX
PAPER OUTPUT METHOD: SORTING/GROUPING/STAPLING

FIG. 11

| IP ADDRESS | NAME OF APPARATUS | SHEET SIZE | COLOR MODE | PRINTING METHOD | PAPER OUTPUT METHOD |
|---|---|---|---|---|---|
| 192.168.1.20 | MFP-0002 | A3/A4 B4/B5 | MONOCHROME | SIMPLEX/ DUPLEX | SORTING/GROUPING |
| 192.168.1.30 | MFP-0003 | A3/A4 B4/B5 | COLOR/ MONOCHROME | SIMPLEX | SORTING/GROUPING /STAPLING |

1101
1102

| IP ADDRESS | SHEET SIZE | COLOR MODE | PRINTING METHOD | PAPER OUTPUT METHOD |
|---|---|---|---|---|
| 192.168.1.20 | A3/A4 B4/B5 | MONOCHROME | SIMPLEX/ DUPLEX | SORTING/GROUPING |
| 192.168.1.30 | A3/A4 B4/B5 | COLOR/ MONOCHROME | SIMPLEX | SORTING/GROUPING /STAPLING |

1103
1104

1301

TYPE OF APPARATUS: INPUT/OUTPUT
NAME OF APPARATUS: MFP-0005
IP ADDRESS: 192.168.1.50
SHEET SIZE: A3/A4/B4/B5
COLOR MODE: COLOR/MONOCHROME
PRINTING METHOD: SIMPLEX/DUPLEX
PAPER OUTPUT METHOD: SORTING/GROUPING/STAPLING

FIG. 14

| IP ADDRESS | NAME OF APPARATUS | SHEET SIZE | COLOR MODE | PRINTING METHOD | PAPER OUTPUT METHOD |
|---|---|---|---|---|---|
| 192.168.1.50 | MFP-0005 | A3/A4 B4/B5 | COLOR/ MONOCHROME | SIMPLEX/ DUPLEX | SORTING/GROUPING /STAPLING |

1401

| IP ADDRESS | SHEET SIZE | COLOR MODE | PRINTING METHOD | PAPER OUTPUT METHOD |
|---|---|---|---|---|
| 192.168.1.50 | A3/A4 B4/B5 | COLOR/ MONOCHROME | SIMPLEX/ DUPLEX | SORTING/GROUPING /STAPLING |

1402

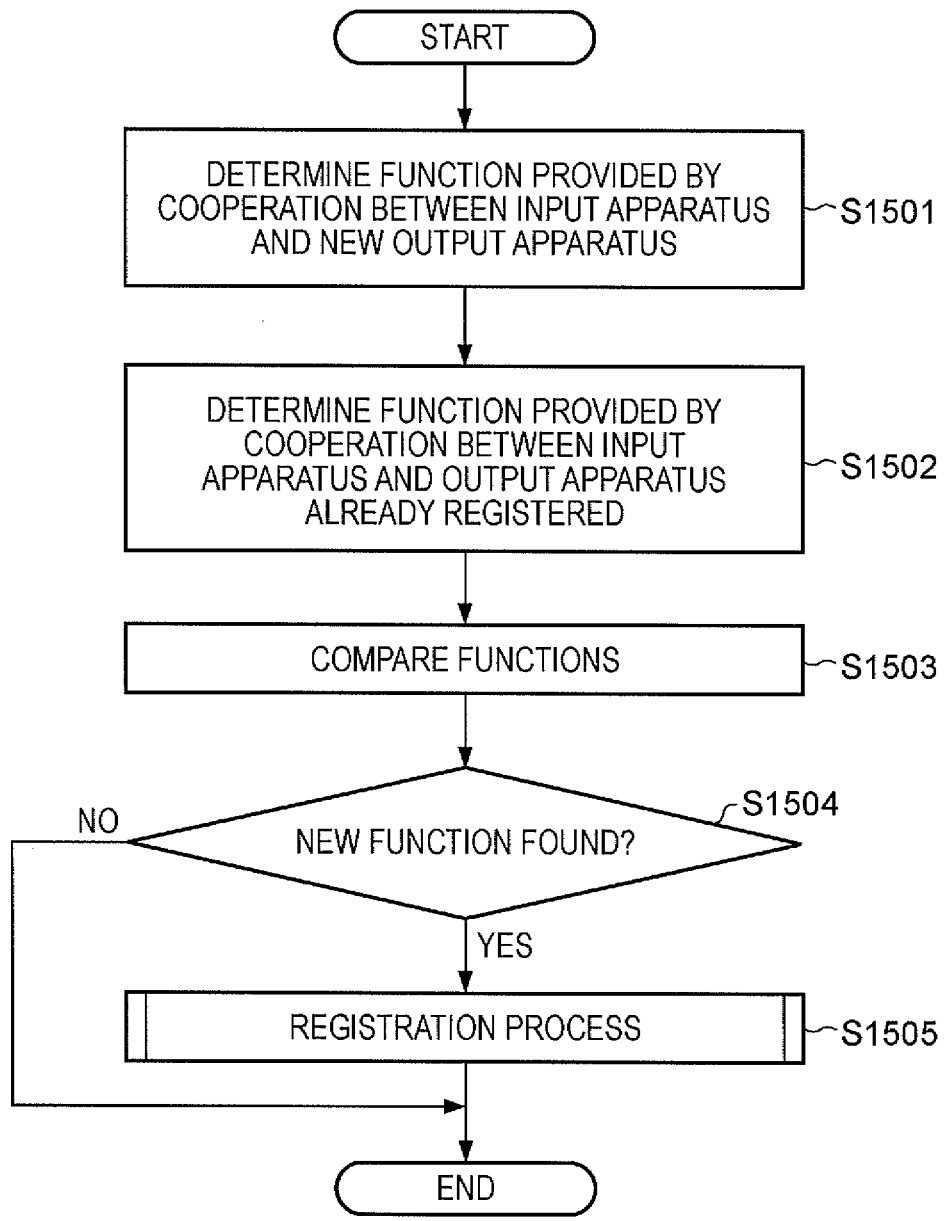

IMAGE PROCESSING APPARATUS AND METHOD FOR CONTROLLING IMAGE PROCESSING APPARATUS

BACKGROUND OF THE INVENTION

1. Field of the Invention

The present invention relates to an image processing apparatus capable of performing the processing thereof in collaboration with another image processing apparatus connected to the image processing apparatus via a network.

2. Description of the Related Art

Recently, systems have been widely used in which an input apparatus and an output apparatus both serving as image processing apparatuses collaboratively operate to perform image processing via a network. Image processing performed collaboratively by an input apparatus and an output apparatus via a network provides a function that cannot be provided by only one input apparatus and an output apparatus. For example, when a scanner serving as an input apparatus and a printer serving as an output apparatus collaboratively operate over a network, a copy function can be achieved. In addition, by transmitting image data to a facsimile machine in the network, a scanner that has no facsimile transmission function can be given a facsimile transmission function.

In order to operate collaboratively with an output apparatus, an input apparatus needs to register the output apparatus therewith. In general, to register a desired output apparatus with an input apparatus as a collaborative output apparatus, a user inputs the IP address of the output apparatus to the input apparatus. Alternatively, in response to a user instruction, the input apparatus searches for the output apparatus and registers the found output apparatus therewith.

However, the operation to input an IP address or a search instruction to the input apparatus is a troublesome task for users. Accordingly, a system is proposed that automatically registers an output apparatus with an input apparatus without user intervention (refer to, for example, Japanese Patent Laid-Open No. 2000-39975).

In this existing technology, when an input apparatus or an output apparatus is connected to a network, the input apparatus or the output apparatus automatically sends the information associated with the apparatus to a server located in the network. The server sends information indicating that a new input apparatus or output apparatus is connected to the network to the input apparatuses or output apparatuses in the network. Upon receiving this information, the input apparatuses or output apparatuses register the newly added input apparatus or output apparatus with themselves.

This existing technology can reduce the load imposed on the user required for registering an output apparatus with an input apparatus. However, every time a new input apparatus or output apparatus is connected to the network, the input apparatus or output apparatus is registered automatically. Accordingly, even an input apparatus or output apparatus that is not used as a collaborative apparatus is registered.

For example, if a new output apparatus is connected to the network and an input apparatus has already registered an output apparatus having a function that is the same as that of the new output apparatus, the input apparatus need not register the new output apparatus.

As noted above, the existing technology cannot provide control to find an apparatus necessary for a collaborative operation and to register that apparatus with an input apparatus.

SUMMARY OF THE INVENTION

The present invention provides an image processing apparatus and a method for controlling the image processing apparatus capable of reducing the load imposed on a user and preventing an unnecessary apparatus from being registered with the image processing apparatus as a collaborative apparatus when a plurality of image processing apparatuses collaboratively function in a network.

According to a first aspect of the present invention, an image processing apparatus includes a storage unit configured to store information about an other image processing apparatus different than the image processing apparatus that operates with the image processing apparatus, an acquiring unit configured to acquire function information indicating a function provided by a first image processing apparatus, a comparing unit configured to compare function information indicating a function provided by the image processing apparatus with the function information acquired by the acquiring unit, and a control unit configured to, in a case that a comparison result of the comparing unit indicates that the first image processing apparatus includes at least one function not provided by the image processing apparatus, store information about the first image processing apparatus in the storage unit, and in a case that a comparison result of the comparing unit indicates that the first image processing apparatus doesn't include at least one function not provided by the image processing apparatus, not to store information about the first image processing apparatus in the storage unit.

According to a second aspect of the present invention, an image processing apparatus includes a storage unit configured to store information about a first image processing apparatus different from the image processing apparatus that operates with the image processing apparatus, an acquiring unit configured to acquire function information indicating a function provided by a second image processing apparatus, a comparing unit configured to compare the function information acquired by the acquiring unit with function information indicating a function provided by the first image processing apparatus, and a control unit configured to, in a case that a comparison result of the comparing unit indicates that the second image processing apparatus includes at least one function not provided by the first image processing apparatus, store information about the second image processing apparatus in the storage unit, and in a case that a comparison result of the comparing unit indicates that the second image processing apparatus doesn't include at least one function not provided by the first image processing apparatus, not to store information about the second image processing apparatus in the storage unit.

According to a third aspect of the present invention, an image processing apparatus includes a storage unit configured to store information about a first image processing apparatus different than the image processing apparatus that operates with the image processing apparatus, an acquiring unit configured to acquire function information indicating a function provided by a second image processing apparatus, a first determining unit configured to determine a function provided by collaboration between the image processing apparatus and the first image processing apparatus based on function information about the image processing apparatus and function information about the first image processing apparatus, a second determining unit configured to determine a function provided by collaboration between the image processing apparatus and the second image processing apparatus based on function information about the image processing apparatus and function information about the second image processing apparatus, a comparing unit configured to compare the a function determined by the first determining unit with the function determined by the second determining unit, and a control unit configured to, in a case that a comparison result of the comparing unit indicates that the function determined by the second determining unit includes the function not determined by the first determining unit, store the information about the second image processing apparatus in the storage unit, and in a case that a comparison result of the comparing unit indicates that the function determined by the second determining unit don't include the function not provided by the first determining unit, not to store information about the second image processing apparatus in the storage unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIG. 2 is a block diagram of an input apparatus according to a first exemplary embodiment of the present invention.

FIG. 3 is a block diagram of an output apparatus according to the first exemplary embodiment.

FIG. 5 illustrates an example of the information about a collaborative output apparatus managed by a remote-apparatus management unit according to the first exemplary embodiment.

FIG. 6 illustrates an example of function information provided by the collaboration between an input apparatus and an output apparatus and managed by the remote-apparatus management unit according to the first exemplary embodiment.

FIG. 7 is a sequence diagram of a registration process for automatically registering a collaborative output apparatus with an input apparatus according to the first exemplary embodiment.

FIG. 8 is a flow chart of a detailed function information matching process illustrated in FIG. 7 according to the first exemplary embodiment.

FIG. 9 illustrates examples of the function information about an input apparatus and output apparatuses according to the first exemplary embodiment.

FIG. 11 illustrates an example of the information managed by the remote-apparatus management unit according to the first exemplary embodiment.

FIG. 14 illustrates an example of the information managed the remote-apparatus management unit according to the first exemplary embodiment.

FIG. 15 is a detailed flow chart of an example of a function information matching process performed in a step illustrated in FIG. 7, according to a second exemplary embodiment of the present invention.

DESCRIPTION OF THE EMBODIMENTS

Exemplary embodiments of the present invention are described with reference to the accompanying drawings.

Figure 1:
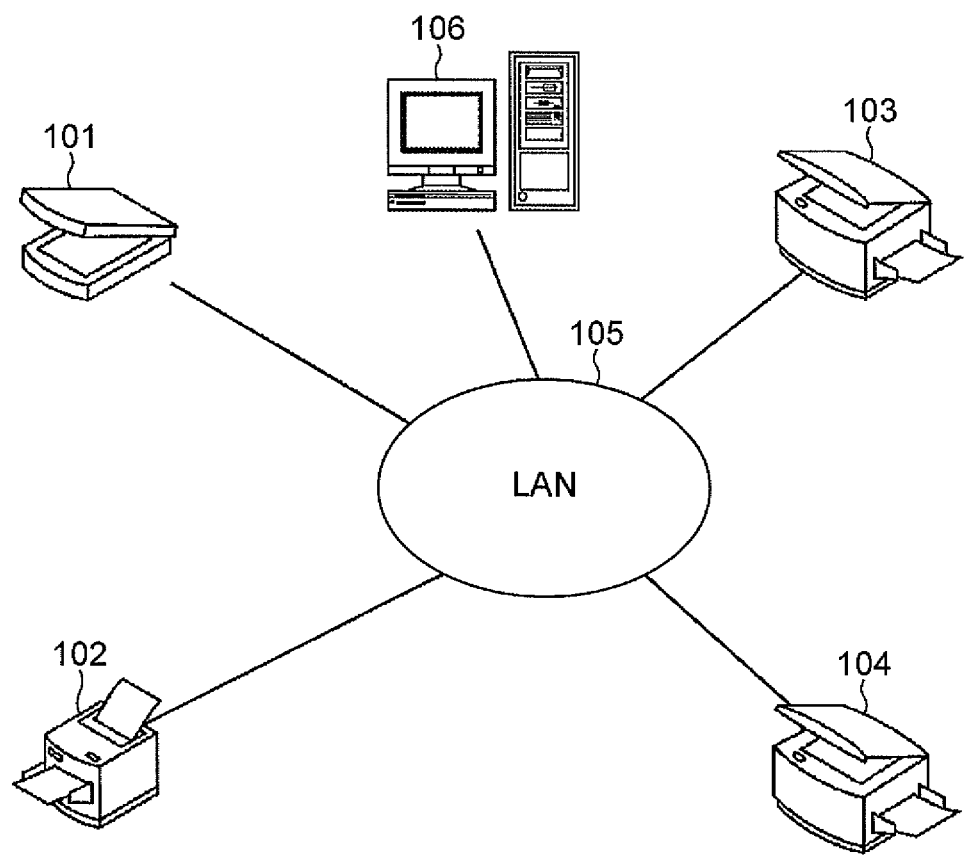
FIG. 1 is a block diagram of a system according to an exemplary embodiment of the present invention.

FIG. 1 is a block diagram of a network system according to a first exemplary embodiment of the present invention.

The network system includes an image processing apparatus (hereinafter referred to as an "input apparatus") 101, such as a scanner, an image processing apparatus (hereinafter referred to as an "output apparatus") 102, such as a printer, input/output apparatuses 103 and 104, each including the functions of an input apparatus and an output apparatus, an information processing apparatus 106, such as a personal computer, and a local area network (LAN) 105.

The input apparatus 101 performs input processing, such as scanning an image. The output apparatus 102 performs output processing, such as printing an image. The input/output apparatuses 103 and 104 can scan and print an image. The information processing apparatus 106 communicates data with the input apparatus 101, the output apparatus 102, and the input/output apparatuses 103 and 104. The input apparatus 101, the output apparatus 102, and the input/output apparatuses 103 and 104 are connected to the LAN 105 to communicate data with other apparatuses.

The input apparatus 101 can operate collaboratively with the output apparatus 102, the input/output apparatus 103, or the input/output apparatus 104. In addition, the input/output apparatuses 103 and 104 can operate collaboratively with the output apparatus 102 or with each other. As used herein, the term "collaborative operation" refers to an operation performed by a plurality of apparatuses. For example, when the input apparatus operates collaboratively with the output apparatus, the output apparatus prints an image scanned by the input apparatus. Thus, a virtual input/output apparatus can be achieved.

FIG. 2 is a block diagram of the input apparatus 101.

As illustrated in FIG. 2, the input apparatus 101 includes a user interface (I/F) unit 201, a central processing unit (CPU) 202, a random access memory (RAM) 203, a scanner 204, a communication unit 205, a remote-apparatus management unit 206, a function information processing unit 207, and a program storage section 208. The user I/F unit 201 receives a user operation of the input apparatus and displays information for the user. The RAM 203 provides a work area to the CPU 202, which selects and reads out a program for processing from the program storage section 208 as needed and executes the program. In addition, data input via the user I/F unit 201 and image data scanned by the scanner 204 are stored in the RAM 203.

The scanner 204 scans an image. The communication unit 205 enables connection to a network and data input and output via the network. In the present embodiment, descriptions are made with reference to a network, such as a LAN. However, any communication interface, such as a public line, that would enable practice of the present invention is applicable. The remote-apparatus management unit 206 manages an output apparatus operating collaboratively with the input apparatus 101 in the network. The function information processing unit 207 stores and provides function information about the input apparatus 101. In addition, the function information processing unit 207 manages function information about collaborative apparatuses. The program storage section 208 is provided by, for example, a hard disk or a read only memory (ROM).

FIG. 3 is a block diagram of the output apparatus 102.

As illustrated in FIG. 3, the output apparatus 102 includes a user I/F unit 301, a central processing unit (CPU) 302, a random access memory (RAM) 303, a printer 304, a communication unit 305, a function information processing unit 306, and a program storage section 307. The user I/F unit 301 receives a user operation of the output apparatus and displays information for the user. The RAM 303 provides a work area to the CPU 302, which selects and reads out a program for processing from the program storage section 307 as needed and executes the program. In addition, data input from the user I/F unit 301 and image data to be output to the printer 304 are stored in the RAM 303.

The printer 304 forms an image on a recording sheet based on the image data. The communication unit 305 enables connection to the network and data input and output via the network. The function information processing unit 306 stores and provides function information about the output apparatus 102. The program storage section 307 is provided by, for example, a hard disk or a ROM.

Each of the input/output apparatuses 103 and 104 includes the functions of the input apparatus and the output apparatus illustrated in FIGS. 2 and 3.

Figure 4:
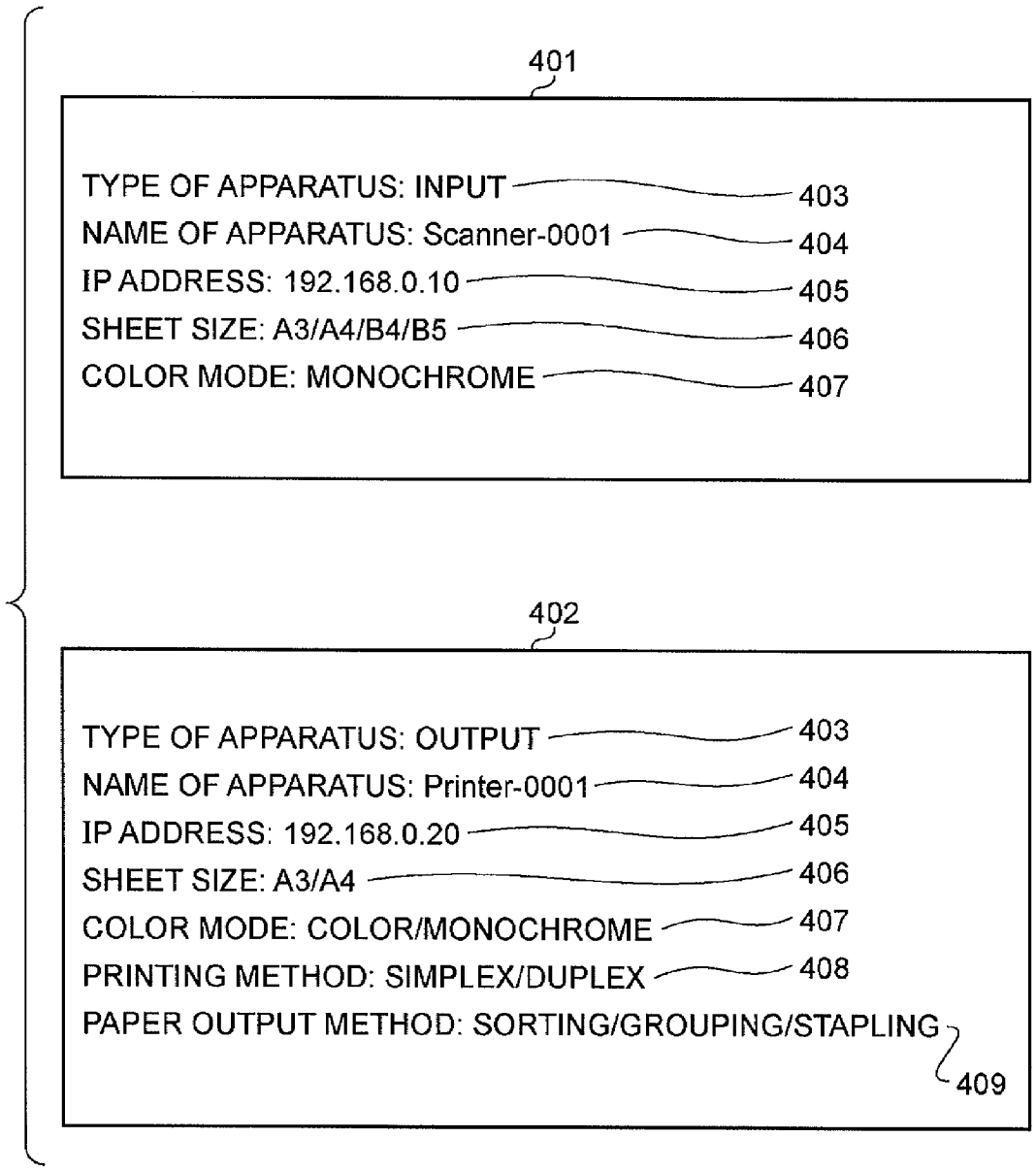
FIG. 4 illustrates an example of function information managed by a function information processing unit according to the first exemplary embodiment.

FIG. 4 illustrates an example of the function information about the apparatuses managed by the function information processing unit 207 and the function information processing unit 306. Function information 401 represents the function information about the input apparatus 101. Function information 402 represents the function information about the output apparatus 102. A field 403 includes information indicating the type of the apparatus (i.e., an input apparatus, an output apparatus, or an input/output apparatus). A field 404 includes information representing the name of the apparatus.

A field 405 contains an IP address used by the apparatus when the apparatus is connected to the network. A field 406 indicates a sheet size. For an input apparatus, the field 406 indicates a scannable sheet size. For an output apparatus, the field 406 indicates a printable sheet size. A field 407 contains a color mode, such as color, monochrome, or a combination thereof. For an input apparatus, the field 407 indicates a scannable color mode. For an output apparatus, the field 407 indicates a printable color mode. A field 408 indicates a printing method, such as simplex printing, duplex printing, bookbinding printing, or a combination thereof. A field 409 indicates a paper output method, such as sorting, grouping, stapling or a combination thereof.

Information 501 of FIG. 5 illustrates an example of the information about a collaborative output apparatus managed by the remote-apparatus management unit 206. A field 502 contains an IP address. In the present embodiment, the collaborative output apparatus is identified using an IP address. A field 503 includes information representing the name of the collaborative output apparatus. Fields 504, 505, 506, and 507 contain pieces of the function information acquired from the function information processing unit 306 of the collaborative output apparatus. The pieces of information in the fields 504, 505, 506, and 507 correspond to the pieces of information in the field 406, 407, 408, and 409, respectively. In this example, these pieces of information are set for the output apparatus 102 and the input/output apparatuses 103.

FIG. 6 illustrates an example of the function information provided by the collaboration between the output apparatus and the input apparatus and managed by the remote-apparatus management unit 206. In this example, the collaborative output apparatuses illustrated in FIG. 5 are set in the input apparatus 101 having a function illustrated in the function information 401 illustrated in FIG. 4. Information 601 indicates the case where the output apparatus 102 is the collaborative apparatus. A field 602 contains an IP address that is the same as that in the field 502. The remote-apparatus management unit 206 identifies an output apparatus using this information.

Fields 603, 604, 605, and 606 contain pieces of the function information provided by the combination of the input apparatus and the output apparatus. The fields are described next with reference to an example of the information 601. A field 603 indicates the sheet size that is printable by the output apparatus 102. A field 604 contains a color mode. The output apparatus 102 can output a color page and a monochrome page. However, the input apparatus 101 can scan only a monochrome image. Accordingly, when the input apparatus 101 and the output apparatus 102 collaboratively operate, only a monochrome image can be manipulated. A field 605 indicates a printing method. In this case, the field 605 indicates simplex/duplex printing that the output apparatus 102 can provide. A field 606 indicates a paper output method. In this case, the field 606 indicates sorting, grouping, and stapling that the output apparatus 102 can provide.

FIG. 7 is a sequence diagram of a registration process for registering a collaborative output apparatus with an input apparatus according to the present embodiment. Information exchanged between an input apparatus and an output apparatus and a process performed by the input apparatus are schematically illustrated in FIG. 7. At step S101, when an output apparatus is connected to the LAN, the output apparatus sends a connection notification to the input apparatus. This information is sent to all of the apparatuses in the LAN through a broadcast transfer.

At step S102, upon receipt of the information sent at step S101, the input apparatus sends a request for the function information to the output apparatus that has sent the connection notification. At step S103, the output apparatus sends the function information about the output apparatus to the input apparatus that has sent the request. The function information that is sent is the function information 402 illustrated in FIG. 4. This function information is stored in the function information processing unit 306 of the output apparatus. Upon receipt of the function information, the input apparatus, at step S104, performs a function information matching process, which is described in detail below with reference to FIG. 8. Subsequently, at step S105, the input apparatus performs a remote-apparatus registering process using the result of the function information matching process.

In this example, the process is performed when a new output apparatus is connected to the LAN to which the input apparatus is connected. However, the same process is applicable when the input apparatus is connected to the LAN to which the output apparatus is connected. That is, in the steps illustrated in FIG. 7, only the input apparatus and the output apparatus are exchanged.

In addition, in the present example, the new output apparatus connected to the network sends the broadcast notification at step S101. However, the present invention is not limited thereto. For example, a server including a computer may be provided in the network. A new output apparatus connected to the network may send the notification message to the server. Alternatively, the server may periodically monitor whether a new apparatus is connected to the network. In such a case, the input apparatus receives the notification indicating that the new output apparatus is connected to the network from the server.

FIG. 8 is a flow chart of a detailed function information matching process performed by the input apparatus in step S104 in FIG. 7. The steps illustrated in FIG. 8 are performed by the CPU 202 executing a program read out from the program storage section 208 of the input apparatus into the RAM 203.

At step S801, the communication unit 205 acquires the function information about an output apparatus sent from the output apparatus. At step S802, the CPU 202 first retrieves the function information about the input apparatus from the function information processing unit 207. Then, the CPU 202 compares the function information about the output apparatus acquired at step S801 with the function information about the input apparatus.

At step S803, if the function information about the output apparatus acquired at step S801 is the same as the function information about the input apparatus, the processing is completed without registering the newly connected output apparatus. That is, if the output apparatus includes no new functions as compared with the functions of the input apparatus, the processing is completed without registering the newly connected output apparatus. If the function information acquired at step S801 is not the same as the function information about the input apparatus, that is, if the output apparatus includes a new function compared with the functions of the input apparatus, the processing proceeds to step S804.

At step S804, the CPU 202 determines whether the remote-apparatus management unit 206 manages another output apparatus. If the remote-apparatus management unit 206 manages another output apparatus, the processing proceeds to step S805. Otherwise, the processing proceeds to step S809.

At step S805, the CPU 202 first acquires the function information about the output apparatus managed by the remote-apparatus management unit 206. Then, the CPU 202 compares the function information about the output apparatus acquired at step S801 with the function information about the output apparatus managed by the remote-apparatus management unit 206. At step S806, if the function information about the output apparatus acquired at step S801 is the same as the function information about the output apparatus managed by the remote-apparatus management unit 206, the processing is completed without registering the newly connected output apparatus.

That is, if the newly connected output apparatus includes no additional functions compared with the functions of the already registered output apparatus, the processing is completed without registering the newly connected output apparatus. If the function information acquired at step S801 is not the same as the function information about the output apparatus managed by the remote-apparatus management unit 206, that is, if the newly connected output apparatus includes a new function compared with the functions of the already registered apparatus, the processing proceeds to step S807.

At step S807, the CPU 202 determines whether an output apparatus other than the output apparatuses already compared has been registered in the remote-apparatus management unit 206. If another output apparatus has been registered, the processing returns to step S805. If another output apparatus has not been registered, the processing proceeds to step S808.

At step S808, the CPU 202 registers the newly connected output apparatus. This registration process is described below with reference to FIG. 12. At step S809, the CPU 202 registers the output apparatus that sent the function information acquired at step S801 with the remote-apparatus management unit 206. More specifically, the function information acquired at step S801 is registered with the remote-apparatus management unit 206.

The function information comparison process is described next with reference to a specific example. In the example, the output apparatuses are sequentially connected to the LAN. At that time, how the registration information in the remote-apparatus management unit 206 changes is described next.

FIG. 9 illustrates the function information about an input apparatus that is originally connected to the LAN and the function information about three output apparatuses that are to be sequentially connected to the LAN.

In FIG. 9, function information 901 represents the function information about the input apparatus that is originally connected to the LAN. In practice, the input apparatus is a multi function peripheral (MFP) having the function of an output apparatus. However, the MFP operates as the input apparatus described in FIGS. 7 and 8. Therefore, for discussion purposes, the MFP is referred to as an "input apparatus".

Function information 902 represents the function information about the first output apparatus connected to the LAN to which the input apparatus having the function information 901 is connected. Function information 903 represents the function information about the second output apparatus connected to the LAN to which the input apparatus having the function information 901 is connected. Function information 904 represents the function information about the third output apparatus connected to the LAN to which the input apparatus having the function information 901 is connected.

In practice, the first to third output apparatuses having the function information 902 to 904, respectively, are MFPs having the function of an input apparatus. However, these MFPs operate as the output apparatus described in FIGS. 7 and 8. Therefore, for discussion purposes, the MFPs are referred to as "output apparatuses".

In the case illustrated in FIG. 9, the function information matching process performed by the input apparatus and a change in the registration information stored in the remote-apparatus management unit 206 are described next with reference to the flow chart illustrated in FIG. 8.

At step S801, the input apparatus acquires the function information 902 about the first output apparatus. At step S802, the input apparatus compares the function information 901 thereof with the function information 902 acquired at step S801. As a result of the comparison, it is determined that the "duplex printing" function in the printing method is newly present (Yes at step S803). Then, the processing proceeds to step S804.

At step S804, it is determined whether another output apparatus has been already registered with the remote-apparatus management unit 206. In this case, another output apparatus has not been registered. Accordingly, the processing proceeds to step S809. At step S809, the input apparatus registers the function information 902 acquired at step S801 with the remote-apparatus management unit 206.

Figure 10:
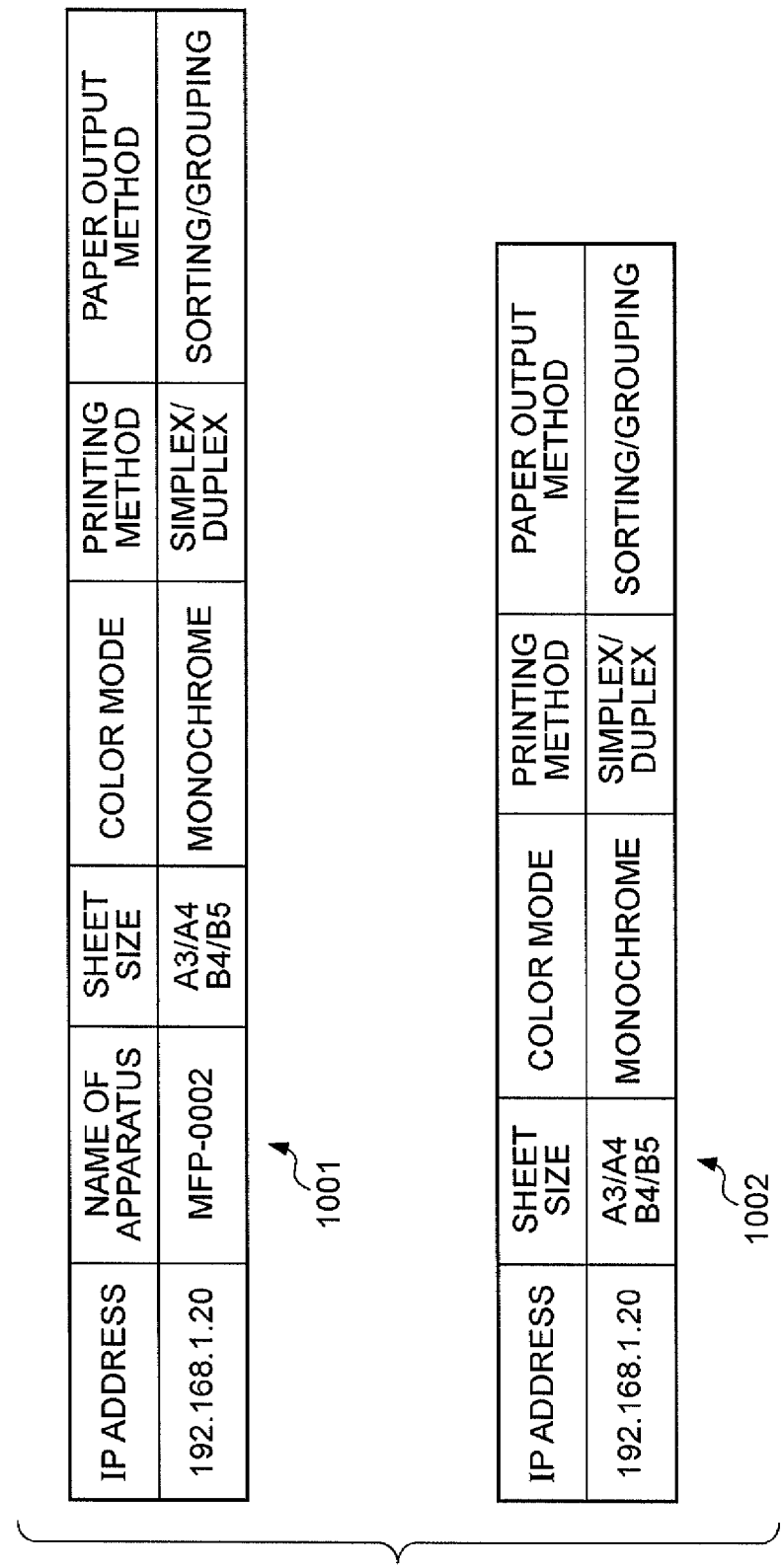
FIG. 10 illustrates an example of the information managed by the remote-apparatus management unit according to the first exemplary embodiment.

FIG. 10 illustrates the registration information stored in the remote-apparatus management unit 206 after the function information 902 is registered at step S809. The information about the output apparatus having the function information 902 is added to the collaborative output apparatus information 1001. In addition, function information provided by the collaboration between the input apparatus having the function information 901 and the output apparatus having the function information 902 is added to function information 1002, which indicates the functions provided by the collaboration between an input apparatus and an output apparatus.

Next, the second output apparatus is connected to the network. In this case, the output apparatus having the function information 903 is connected. At step S801, the input apparatus acquires the function information 903 about the second output apparatus. At step S802, the input apparatus compares the function information 901 thereof with the function information 903 acquired at step S801. As a result of the comparison, it is determined that the "stapling" function in the paper output method is newly present (Yes at step S803). The processing then proceeds to step S804.

At step S804, it is determined whether another output apparatus has been already registered with the remote-apparatus management unit 206. In this case, the output apparatus having the function information 902 has already been registered. Accordingly, the processing proceeds to step S805. At step S805, the input apparatus compares the collaborative output apparatus information 1001 with the function information 903 about the newly connected second output apparatus. As a result of the comparison, it is determined that the "stapling" function in the paper output method is newly present (Yes at step S806).

The processing then proceeds to step S807, where it is determined whether another apparatus has been registered with the remote-apparatus management unit 206. In this case, another output apparatus has not been registered. Accordingly, the processing proceeds to step S808. Although processing at step S808 is described in detail below, the input apparatus registers the function information 903 acquired at step S801 with the remote-apparatus management unit 206.

FIG. 11 illustrates the registration information stored in the remote-apparatus management unit 206 after the function information 903 is newly registered at step S808. The registration information includes the collaborative output apparatus information 1101 and 1102. That is, the information about the output apparatus having the function information 903 is added to the registration information. In addition, information 1103 and 1104 represent the function information provided by the collaboration between the input apparatus and the output apparatuses. As illustrated, the function information provided by the collaboration between the input apparatus having the function information 901 and the output apparatus having the function information 903 is added.

Next, the third output apparatus is connected to the network. In this case, the output apparatus having the function information 904 is connected. At step S801, the input apparatus acquires the function information 904 about the third output apparatus. At step S802, the input apparatus compares the function information 901 thereof with the function information 904 acquired at step S801. As a result of the comparison, it is determined that the "stapling" function in the paper output method is newly present (Yes at step S803). The processing then proceeds to step S804. At step S804, it is determined whether another output apparatus has been already registered with the remote-apparatus management unit 206. In this case, the output apparatus having the function information 902 has already been registered. Accordingly, the processing proceeds to step S805.

At step S805, the input apparatus compares the collaborative output apparatus information 1001 with the function information 904 about the newly connected third output apparatus. As a result of the comparison, it is determined that the "stapling" function in the paper output method is newly present (Yes at step S806). The processing then proceeds to step S807, where it is determined whether another apparatus has been registered with the remote-apparatus management unit 206. In this case, the second output apparatus having the function information 903 has been registered. Accordingly, the processing proceeds to step S805 again.

At step S805, the function information 903 is compared with the function information 904 acquired at step S801. As a result of the comparison, it is determined that a new function is not present (No at step S806). Accordingly, the connected third output apparatus is not registered with the remote-apparatus management unit 206. Thereafter, the processing is completed. The registration information stored in the remote-apparatus management unit 206 remains unchanged from that illustrated in FIG. 11.

According to the present embodiment, the input apparatus automatically registers the output apparatus connected to the network as a collaborative apparatus. The input apparatus compares the function of the output apparatus with the function that the input apparatus can provide and with the function that the already registered output apparatus can provide. Thereafter, the input apparatus registers only the output apparatus that includes a new function. Accordingly, the output apparatuses that have a similar function are not double-registered. Thus, in addition to eliminating a user's troublesome work for selecting a collaborative output apparatus, the load imposed on the memory of the input apparatus can be reduced.

Figures 12, 13:
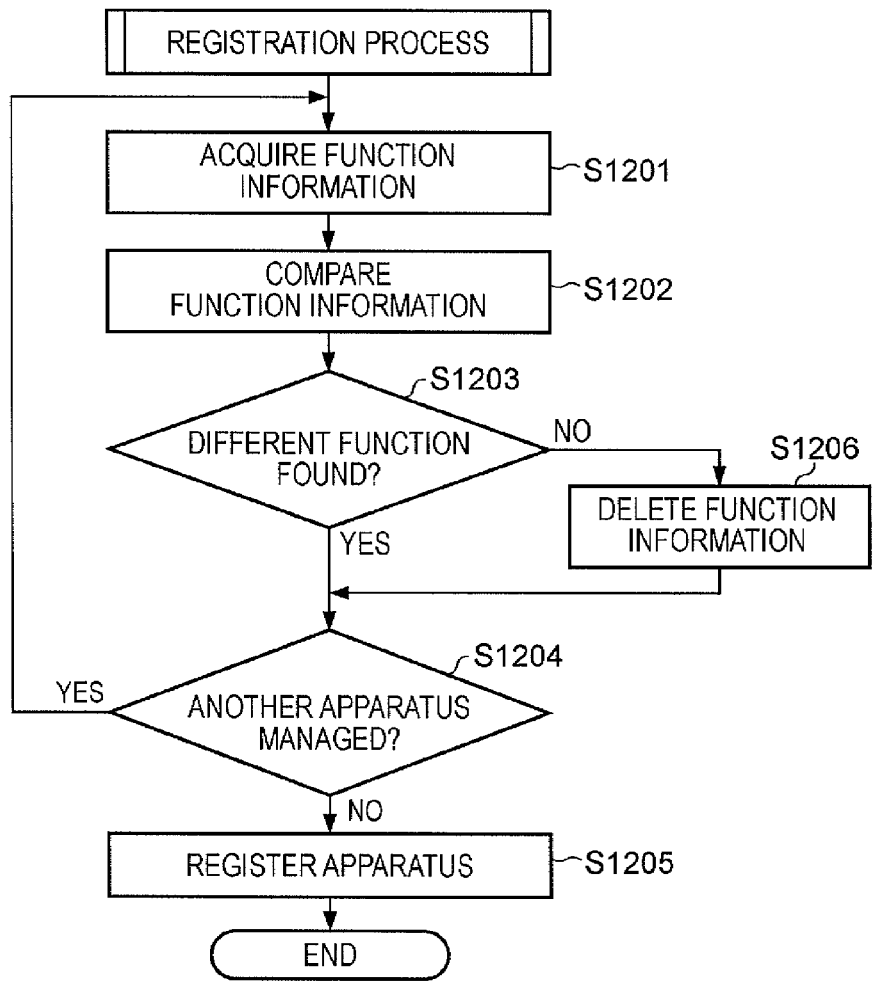
FIG. 12 is an example of a registration process of the function information according to the first exemplary embodiment.
FIG. 13 illustrates an example of the function information about an output apparatus according to the first exemplary embodiment.

The registration process performed at step S808 in FIG. 8 is described next with respect to FIG. 12. Like the process flow in FIG. 8, the steps illustrated in FIG. 12 are performed by the CPU 202 of the input apparatus.

At step S1201, the CPU 202 acquires the function information about the output apparatus managed by the remote-apparatus management unit 206. At step S1202, the CPU 202 compares the function information acquired at step S1201 with the function information acquired at step S801. That is, the CPU 202 compares the function information about an output apparatus that has already been registered with the input apparatus with the function information about a newly connected output apparatus.

At step S1203, as a result of the comparison performed at S1202, if the function information managed by the remote-apparatus management unit 206 is all included in the function information acquired at step S801, the processing proceeds to step S1206. That is, if the output apparatus that has been already managed by the remote-apparatus management unit 206 does not include a function different from those of the newly added output apparatus, the processing proceeds to step S1206.

If, however, all the function information managed by the remote-apparatus management unit 206 is not included in the function information acquired at step S801, the processing proceeds to step S1204. That is, if the output apparatus that has been already managed by the remote-apparatus management unit 206 has a function different from those of the newly added output apparatus, the processing proceeds to step S1204.

At step S1204, it is determined whether the function information about another output apparatus has been registered with the remote-apparatus management unit 206. If the function information about another output apparatus has been registered with the remote-apparatus management unit 206, the processing proceeds to step S1201. Thereafter, the process at step S1201 and the subsequent processes are performed again.

If, however, the function information about another output apparatus has not been registered with the remote-apparatus management unit 206, the processing proceeds to step S1205. At step S1205, the function information acquired at step S801 is registered with the remote-apparatus management unit 206. The processing is then completed.

At step S1206, the CPU 202 deletes the function information about the output apparatus that has already been managed by the remote-apparatus management unit 206. That is, the registration of an output apparatus that does not have a function different from that of the newly connected output apparatus is deleted from the remote-apparatus management unit 206.

The registration process is described next with reference to a specific example. For purposes of the example, assume that a new output apparatus is connected to the LAN having the state described in FIGS. 9 to 11. FIG. 13 illustrates function information 1301 about the newly connected output apparatus.

Assume that the remote-apparatus management unit 206 currently has a state illustrated in FIG. 11. Subsequently, the output apparatus having the function information 1301 is registered. At step S1201, the CPU 202 acquires the function information already registered with the remote-apparatus management unit 206. In this case, the function information 1101 and the function information 1102 are registered. The CPU 202 acquires the function information 1101 first.

At step S1202, the CPU 202 compares the function information 1101 with the function information 1301. All the items of the function information 1101 are included in the function information 1301 (No at step S1203). Accordingly, the processing proceeds to step S1206, where the CPU 202 deletes the function information 1101 from the remote-apparatus management unit 206. Thereafter, the processing proceeds to step S1204, where the CPU 202 determines whether function information about another output apparatus has been registered with the remote-apparatus management unit 206.

As the result of the determination, since the function information 1102 is found, the processing proceeds to step S1201. At step S1201, the CPU 202 acquires the function information 1102 from the remote-apparatus management unit 206. At step S1202, the CPU 202 compares the function information 1102 with the function information 1301. All the items of the function information 1102 are included in the function information 1301 (No at step S1203). Accordingly, the processing proceeds to step S1206, where the CPU 202 deletes the function information 1102 from the remote-apparatus management unit 206. Thereafter, since no function information is registered with the remote-apparatus management unit 206, the processing proceeds to step S1205. At step S1205, the function information 1301 is registered with the remote-apparatus management unit 206. The processing is then completed.

FIG. 14 illustrates the registration information stored in the remote-apparatus management unit 206 of the input apparatus after the registration process illustrated in FIG. 13 is completed. At a time illustrated in FIG. 11, the function information 1101 and the function information 1102 are managed. However, in FIG. 14, only function information 1401 is managed. The types of functions executable by a combination of the input apparatus and the output apparatus remain unchanged from those illustrated in FIG. 11. Similarly, at a time illustrated in FIG. 11, the information 1103 and the information 1104 are managed. However, in FIG. 14, only information 1402 is managed.

As described above, according to the present embodiment, when a new output apparatus is connected to the network, control is performed so that only an output apparatus having a new function is registered. In addition, when the new output apparatus is registered, registration of certain output apparatuses already registered is deleted if a predetermined condition is satisfied. More specifically, if the output apparatus already registered does not include a function different from that of a newly registered output apparatus, the registration of the output apparatus already registered is deleted. In this way, an unnecessary output apparatus is not double-registered.

Note that when the above-described second output apparatus is connected, the registration of the first output apparatus already registered is not deleted from the remote-apparatus management unit 206. That is, at step S1203 illustrated in FIG. 12, it is determined whether the first output apparatus already registered has a function different from that of the second output apparatus. At that time, it is determined that the first output apparatus has a function different from that of the second output apparatus. In this case, the different function is a duplex printing function. Accordingly, if the newly connected output apparatus does not have a function that the already registered output apparatus provides, the registration of the already registered output apparatus is not deleted from the remote-apparatus management unit 206, even when the newly connected output apparatus has a new function.

In the present embodiment, the process illustrated in FIG. 12 is performed after the process of step S807 is completed. However, the process illustrated in FIG. 12 may be performed at a different timing. For example, in the method according to the present embodiment, the process illustrated in FIG. 12 is performed only when a newly registered output apparatus is identified. However, even when the output apparatus having no new functions is connected, the process illustrated in FIG. 12 may be performed if the output apparatus has all of the functions provided by a plurality of already registered output apparatuses.

A second exemplary embodiment is described below. According to the present embodiment, a function information matching process performed by an input apparatus is different from that of the first exemplary embodiment. In the previous embodiment, the function information about a new output apparatus connected to the network is compared with the function information about an input apparatus first. Subsequently, the function information about the new output apparatus is compared with the function information about an output apparatus that has already been registered with the input apparatus.

According to the present embodiment, when a new output apparatus is connected to the network, a function that is executable by a combination of the newly connected output apparatus and the input apparatus is compared with a function that is executable by a combination of the already registered output apparatus and the input apparatus. Then, it is determined whether the newly connected output apparatus is registered with the input apparatus based on the result of the comparison.

The structures and processes described in FIGS. 1 to 7 for the previous embodiment are similarly applied to the present embodiment. Accordingly, descriptions thereof are omitted herein.

FIG. 15 is a detailed flow chart of the function information matching process performed by an input apparatus at step S104 in FIG. 7. The steps illustrated in FIG. 15 are performed by the CPU 202 executing a program read out from the program storage section 208 of the input apparatus into the RAM 203.

At step S1501, the CPU 202 determines functions provided by a combination of a newly connected output apparatus and the input apparatus using the acquired function information about the output apparatus and the function information about the input apparatus. Next, at step S1502, the CPU 202 determines functions provided by the input apparatus and functions provided by a combination of an output apparatus already registered with the remote-apparatus management unit 206 and the input apparatus.

At that time, if no output apparatuses are managed by the remote-apparatus management unit 206, the CPU 202 determines only the functions provided by the input apparatus. At step S1503, the CPU 202 compares the functions determined at step S1501 with the functions determined at step S1502 to determine whether the functions determined at step S1501 are included in the functions determined at step S1502. That is, the CPU 202 determines whether the combination of the input apparatus and the newly connected output apparatus can provide a function that is not available by the combination of the input apparatus and the already registered output apparatus.

At step S1504, if the functions determined at step S1501 are not included in the functions determined at step S1502, the processing proceeds to step S1505. However, if the functions determined at step S1501 are included in the functions determined at step S1502, the processing is completed without registering the newly connected output apparatus. At step S1505, the registration process described in FIG. 12 is performed.

The function information matching process according to the present embodiment is described next with reference to a specific example. For the purposes of the example, assume that new output apparatuses are sequentially connected to the LAN. At that time, how the registration information in the remote-apparatus management unit 206 changes is described next. Like the specific example according to the previous embodiment described in FIG. 12, the following description is made with reference to the function information illustrated in FIG. 9.

When an input/output apparatus having the function information 902 is connected to the LAN to which an input/output apparatus having the function information 901 is connected, the processes illustrated in FIGS. 7 and 15 are performed. In this case, the existing functions are the functions provided by the input/output apparatus having the function information 901. New functions are functions provided by the collaboration between the input/output apparatus having the function information 901 and the input/output apparatus having the function information 902. When the existing functions are compared with the new functions, it can be seen that a "duplex printing" function in the printing method is newly added to the existing functions only in a monochrome mode. Thus, the setting of the collaborative input/output apparatus having the function information 902 is added.

FIG. 10 illustrates the collaborative output apparatus information and the function information provided by the collaboration between the input/output apparatuses. As illustrated in FIG. 10, the collaborative output apparatus information 1001 includes the added information about the input/output apparatus having the function information 902. The function information 1002 includes the added function provided by the collaboration between the input/output apparatus having the function information 901 and the input/output apparatus having the function information 902.

In such a state, when the input/output apparatus having the function information 903 is connected to the LAN, the processes illustrated in FIGS. 7 and 15 are performed, as in the above-described case. The existing functions are the functions provided by the input/output apparatus having the function information 901 and the functions provided by the collaboration between the input/output apparatus having the function information 901 and the input/output apparatus having the function information 902.

New functions are functions provided by the collaboration between the input/output apparatus having the function information 901 and the input/output apparatus having the function information 903. When the existing functions are compared with the new functions, it can be seen that a "stapling" function in the paper output method is newly added to the existing functions. Thus, the setting of the collaborative input/output apparatus having the function information 903 is added.

FIG. 11 illustrates the collaborative output apparatus information and the function information provided by the collaboration between the input/output apparatuses after the above-described process is completed. These two pieces of information are managed by the remote-apparatus management unit 206. As illustrated in FIG. 11, the collaborative output apparatus information 1102 includes the added information about the input/output apparatus having the function information 903. The function information 1104 includes the added function provided by the collaboration between the input/output apparatus having the function information 901 and the input/output apparatus having the function information 903.

In such a state, when the input/output apparatus having the function information 904 is connected to the LAN, the processes illustrated in FIGS. 7 and 15 are performed, as in the above-described cases. The existing functions are the functions provided by the input/output apparatus having the function information 901, the functions provided by the collaboration between the input/output apparatus having the function information 901 and the input/output apparatus having the function information 902, and the functions provided by the collaboration between the input/output apparatus having the function information 901 and the input/output apparatus having the function information 903.

New functions are functions provided by the collaboration between the input/output apparatus having the function information 901 and the input/output apparatus having the function information 904. When the existing functions are compared with the new functions, it can be seen that no functions are newly added to the existing functions. Thus, the collaborative apparatus information remains unchanged from that of FIG. 11.

The present embodiment can provide an advantage similar to that of the previous embodiment. In addition, the present embodiment can provide an advantage in that the same output apparatus is not registered with a large number of the input apparatuses.

For example, assume that an output apparatus A having a "monochrome printing" function is registered with an input apparatus having a "monochrome scanning" function, and an output apparatus B having a "color/monochrome printing" function is newly connected to the network.

In such a case, in the method according to the first embodiment (see the process flow illustrated in FIGS. 8 and 12), since the "color/monochrome printing" function is a new function compared with the "monochrome printing" function, the output apparatus B having the "color/monochrome printing" function is registered with the input apparatus. The registration of the output apparatus A is deleted from the input apparatus.

In contrast, in the method according to the second embodiment (see the process flow illustrated in FIGS. 12 and 15), a monochrome copy function that is a function provided by a combination of a "monochrome scanning" function and a "monochrome printing" function is compared with a monochrome copy function that is a function provided by a combination of a "monochrome scanning" function and a "color/monochrome printing" function. As a result of the comparison, since a new function is not provided, the output apparatus B is not registered with the input apparatus.

That is, when the output apparatus A is compared with the output apparatus B, the output apparatus B includes more functions because the output apparatus B has a color printing function. However, when a function provided by the combination of the output apparatus B and the input apparatus including only a monochrome scanner is considered, the output apparatus B provides only a function similar to that of the output apparatus A. In other words, it is not effective that a color printer operates collaboratively with a monochrome scanner. According to the method of the second embodiment, in such a case, the output apparatus A can be registered with the input apparatus. Therefore, it can be prevented that the output apparatus B having a function superior to that of the output apparatus A is registered with a large number of input apparatuses.

While the exemplary embodiments above have been described with reference to a scanner serving as an input apparatus, the input apparatus is not limited to a scanner. For example, any apparatus that can receive an image may be employed as the input apparatus. Examples of the input apparatus include a copy machine, an MFP, and a facsimile machine. In addition, while the exemplary embodiments above have been described with reference to a printer serving as an output apparatus, the output apparatus is not limited to a printer. For example, any apparatus that can output an image instead of printing an image may be employed as the output apparatus. Examples of the output apparatus include a copy machine, an MFP, and a facsimile machine. These apparatuses can be collectively referred to as "image processing apparatuses".

Furthermore, in the above-described exemplary embodiments, when an output apparatus is registered with an input apparatus, the output apparatus that has a new function is automatically registered without user intervention. However, before the output apparatus that has a new function is registered with the input apparatus, a prompt message asking whether the output apparatus is to be registered or not may be displayed on a screen of the input apparatus in order to acquire user's decision. This method prevents automatic registration of a plurality of output apparatuses with the user unaware of the registration.

In addition, the user's load to manually register an output apparatus or to instruct the input apparatus to search for the output apparatus can be eliminated. Accordingly, the user can easily register the output apparatus. Similarly, in the flow chart illustrated in FIG. 12, the registration of the output apparatus is automatically deleted. However, before the registration of the output apparatus is deleted, a prompt message asking whether the registration of the output apparatus is to be deleted or not may be displayed on a screen of the input apparatus in order to acquire user's decision. This method prevents automatic deletion of the registration of the output apparatus with the user unaware of the deletion.

The present invention can be applied to a system constituted by a plurality of apparatuses (e.g., a host computer, an interface device, a scanner, and a printer), or to an apparatus (e.g., a copy machine or a facsimile machine) comprising a single device.

The present invention can also be achieved by supplying a storage medium storing software program code that achieves the functions of the above-described embodiments to a system or an apparatus and by causing a computer (central processing unit (CPU) or micro-processing unit (MPU)) of the system or apparatus to read and execute the software program code.

In such a case, the program code itself read out of the storage medium realizes the functions of the above-described embodiments. Therefore, the storage medium storing the program code can also realize the present invention. Examples of the storage medium for supplying the program code include a floppy disk, a hard disk, an optical disk, a magnetooptical disk, a CD-ROM (compact disk-read only memory), a CD-R (CD recordable), a magnetic tape, a nonvolatile memory card, ROM, etc.

The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-334430 filed Dec. 12, 2006, which is hereby incorporated by reference herein in its entirety.

What is claimed is:

1. A first image processing apparatus comprising:
a registering unit configured to register a second image processing apparatus that operates cooperatively with the first image processing apparatus via a network;
an acquiring unit configured to acquire function information indicating functions provided by a third image processing apparatus;
a comparing unit configured to compare function information indicating functions provided by the second image processing apparatus with the function information acquired by the acquiring unit;
a control unit configured to cause the registering unit to register, in response to the third image processing apparatus including at least one new function compared with the functions provided by the second image processing apparatus, information about the third image processing apparatus, and not to register, in response to the third image processing apparatus not including any new function compared with the functions provided by the second image processing apparatus, information about the third image processing apparatus; and
a deleting unit configured to delete the registration of the second image processing apparatus in response to the third image processing apparatus including at least one new function compared with the functions provided by the second image processing apparatus.

2. The first image processing apparatus according to claim 1, wherein the functions provided by the second image processing apparatus or the third image processing include at least one of a sheet size, a color mode, a printing method, and a paper output method.

3. The first image processing apparatus according to claim 1, wherein the information about the third image processing apparatus includes at least one of an internet protocol (IP) address and a name of apparatus.

4. The first image processing apparatus according to claim 1, wherein the first image processing apparatus is a scanner, the second image processing apparatus and the third image processing apparatus are printers, and
wherein the second image processing apparatus and the third image processing apparatus print an image scanned by the first image processing apparatus.

5. The first image processing apparatus according to claim 1, further comprising, a display unit configured to display a screen for confirming with a user whether the registration of the second image processing apparatus is to be deleted, in response to a result of comparison by the comparing unit indicating that the third image processing apparatus has a new function compared with functions of the second image processing apparatus, wherein the deleting unit deletes the registration of the second image processing apparatus according to an instruction for deleting the registration from a user.

6. The first image processing apparatus according to claim 1, further comprising, a display unit configured to display a screen for confirming with a user whether the third image processing apparatus is to be registered, in response to a result of comparison by the comparing unit indicating that the third image processing apparatus has a new function compared with functions of the second image processing apparatus, wherein the control unit causes the registering unit to register the third image processing apparatus according to an instruction for registering the third image processing apparatus from a user.

7. A method for a first image processing apparatus, the method comprising:

registering a second image processing apparatus that operates cooperatively with the first image processing apparatus via a network;

acquiring function information indicating functions provided by a third image processing apparatus;

comparing function information indicating functions provided by the second image processing apparatus with the acquired function information;

causing registering to register, in response to the third image processing apparatus including at least one new function compared with the functions provided by the second image processing apparatus, information about the third image processing apparatus, and not to register, in response to the third image processing apparatus not including any new function compared with the functions provided by the second image processing apparatus, information about the third image processing apparatus; and deleting the registration of the second image processing apparatus in response to the third image processing apparatus including at least one new function compared with the functions provided by the second image processing apparatus.

8. A non-transitory computer-readable storage medium storing computer-executable process steps, the computer-executable process steps causing a computer to execute the method of claim 7.

* * * * *